United States Patent
Blackert

[15] 3,685,902
[45] Aug. 22, 1972

[54] FICHE CAMERA DEVICE
[72] Inventor: John E. Blackert, Webster, N.Y.
[73] Assignee: U.S. Dynamics Inc., Elmsford, N.Y.
[22] Filed: April 26, 1971
[21] Appl. No.: 137,215

[52] U.S. Cl. .................355/64, 355/40, 355/45, 355/53, 355/95
[51] Int. Cl. ..........................G03b 27/32
[58] Field of Search ..........95/36, 37; 355/40, 42, 45, 355/53, 54, 95, 64

[56] References Cited
UNITED STATES PATENTS

| | | | |
|---|---|---|---|
| 3,413,064 | 11/1968 | Roberts | 355/42 |
| 3,517,250 | 8/1950 | Shea et al. | 355/42 X |
| 3,515,477 | 6/1970 | Hein et al. | 355/45 X |
| 3,558,226 | 1/1971 | Riggs et al. | 355/54 |
| 3,586,437 | 6/1971 | Dietz et al. | 355/53 |

Primary Examiner—Samuel S. Matthews
Assistant Examiner—E. M. Bero
Attorney—Ralph L. Thomas and Thomas & Thomas

[57] ABSTRACT

A fiche camera is described for exposing frames on a film strip which subsequently is converted to a matrix array of photographic frames on a fiche, and the camera includes a fiche coordinate counting and display device, a shutter for exposing the photographic frames of the film strip, a film transport for advancing the strip film, and camera controls which include a record mechanism that automatically initiate operation of the shutter, the film transport, and the fiche coordinate counting and display device each time the record mechanism is operated. The fiche coordinate counting means visually displays the fiche coordinates of fiche number, column number, and frame number to the operator as documents are recorded.

20 Claims, 11 Drawing Figures

PATENTED AUG 22 1972 3,685,902
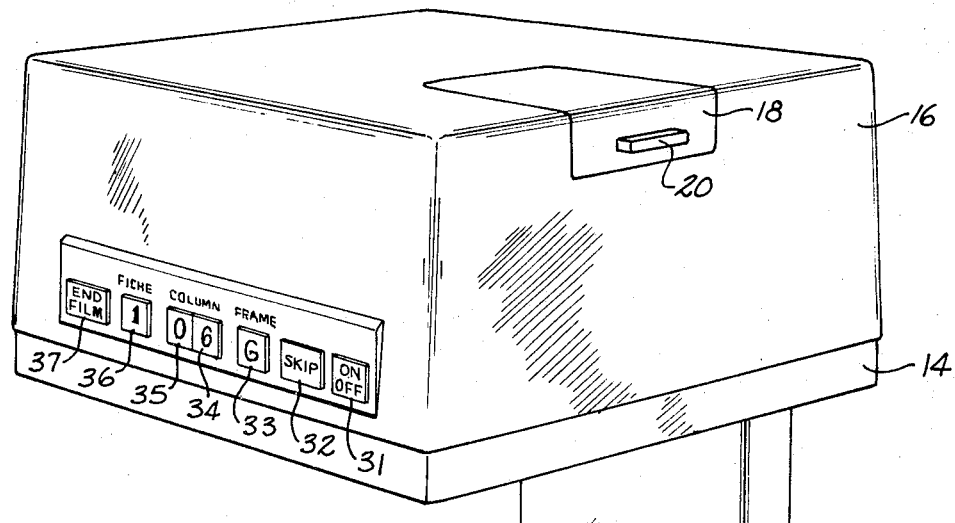
Fig. 1
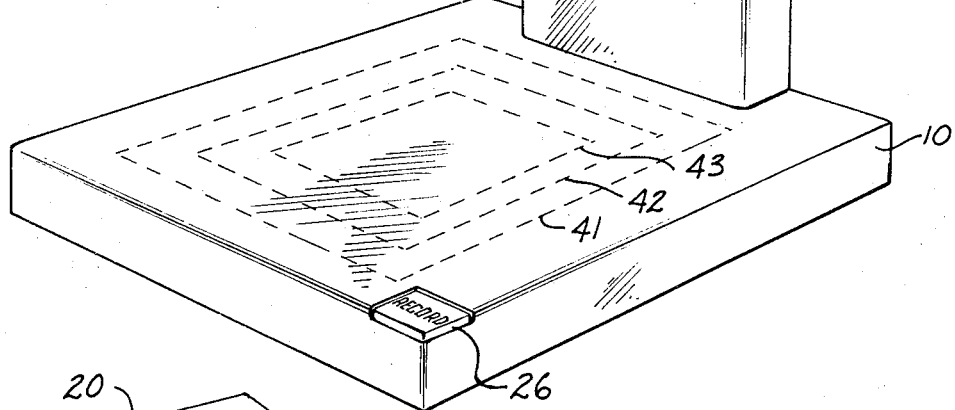
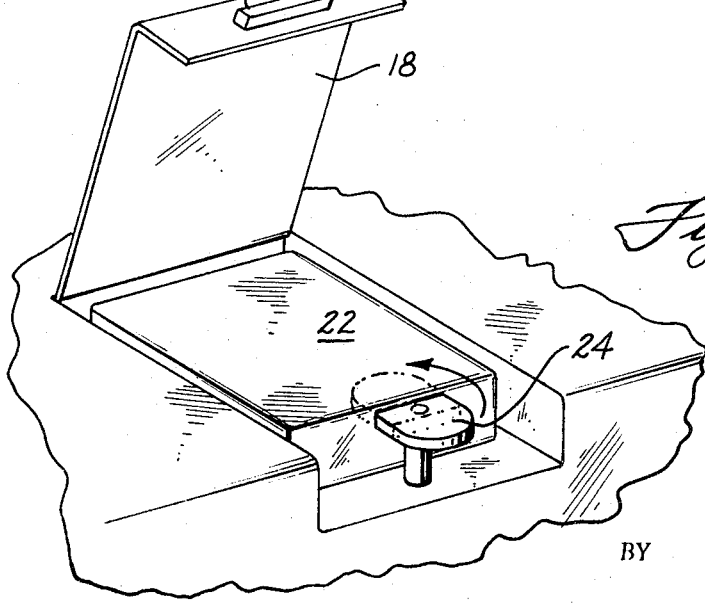
Fig. 2
INVENTOR
JOHN E. BLACKERT
BY Thomas & Thomas
ATTORNEYS

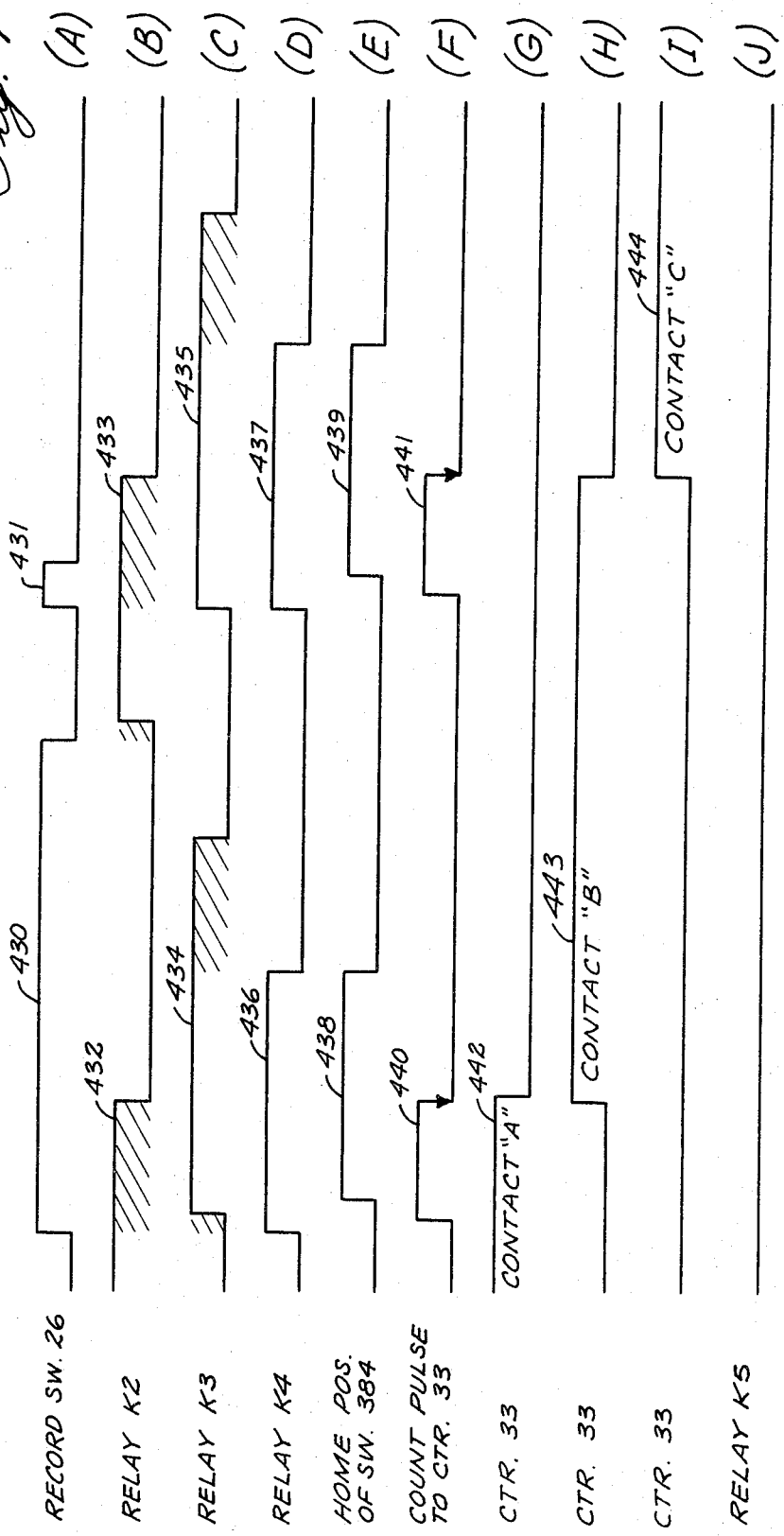

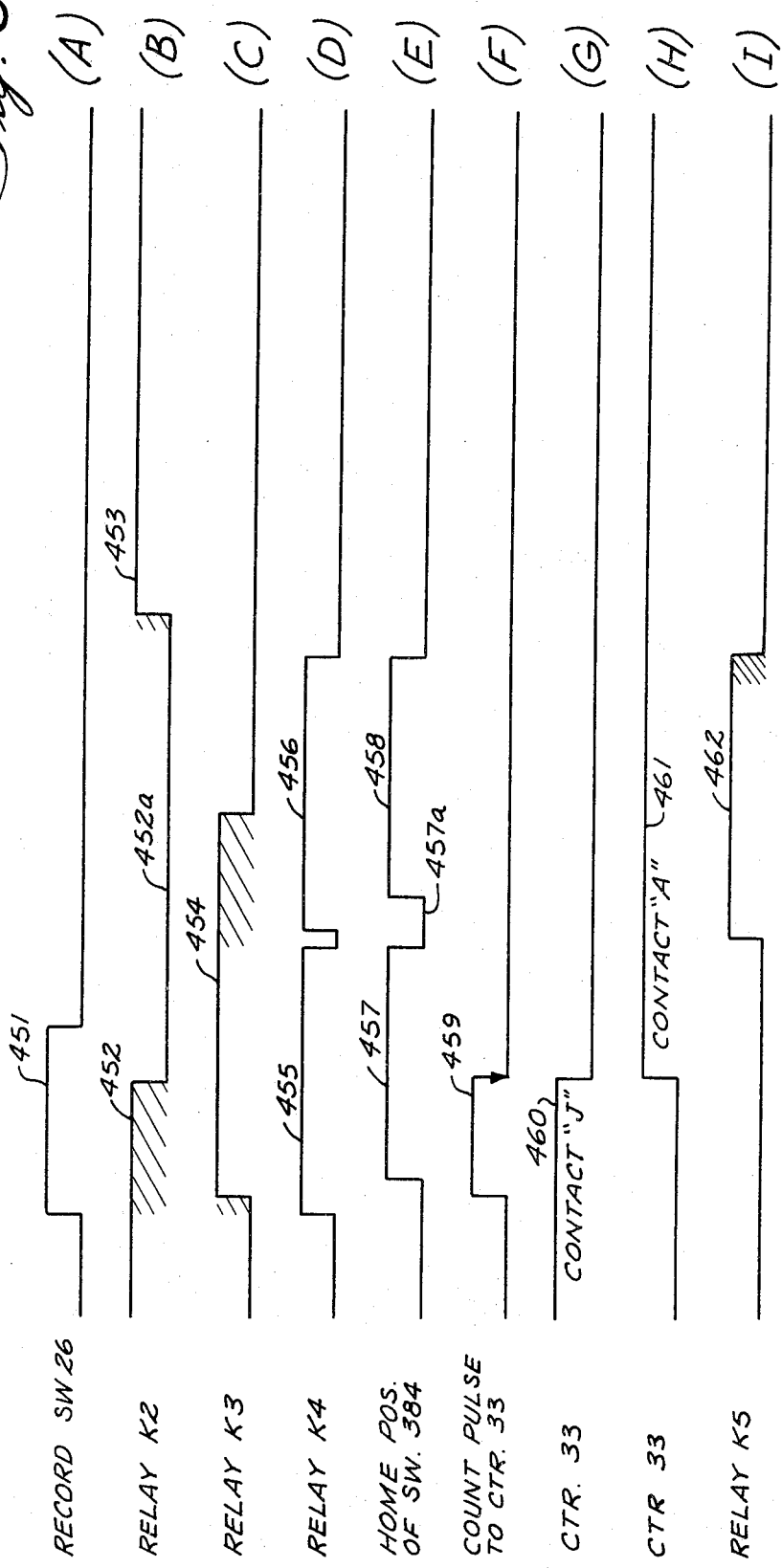

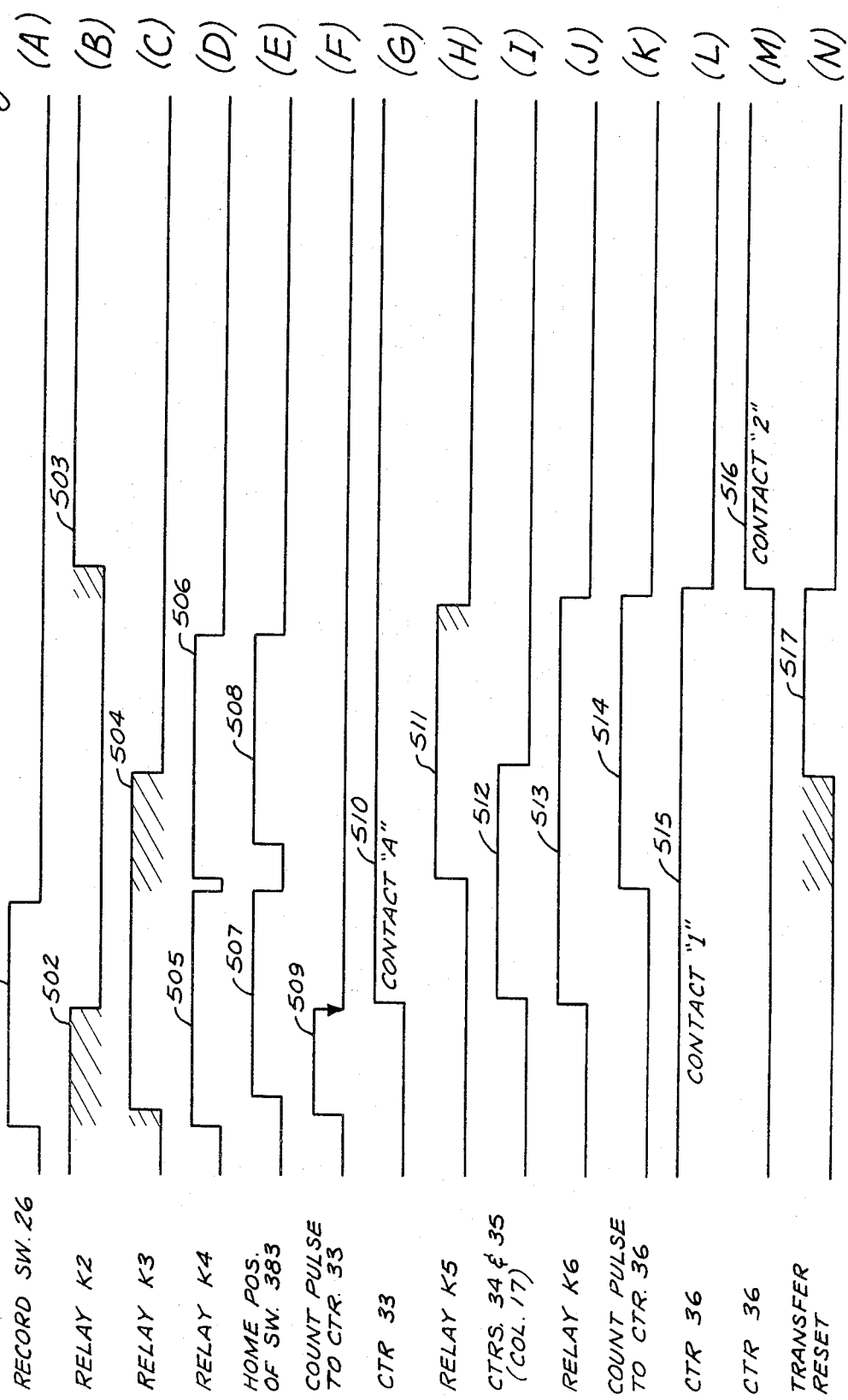

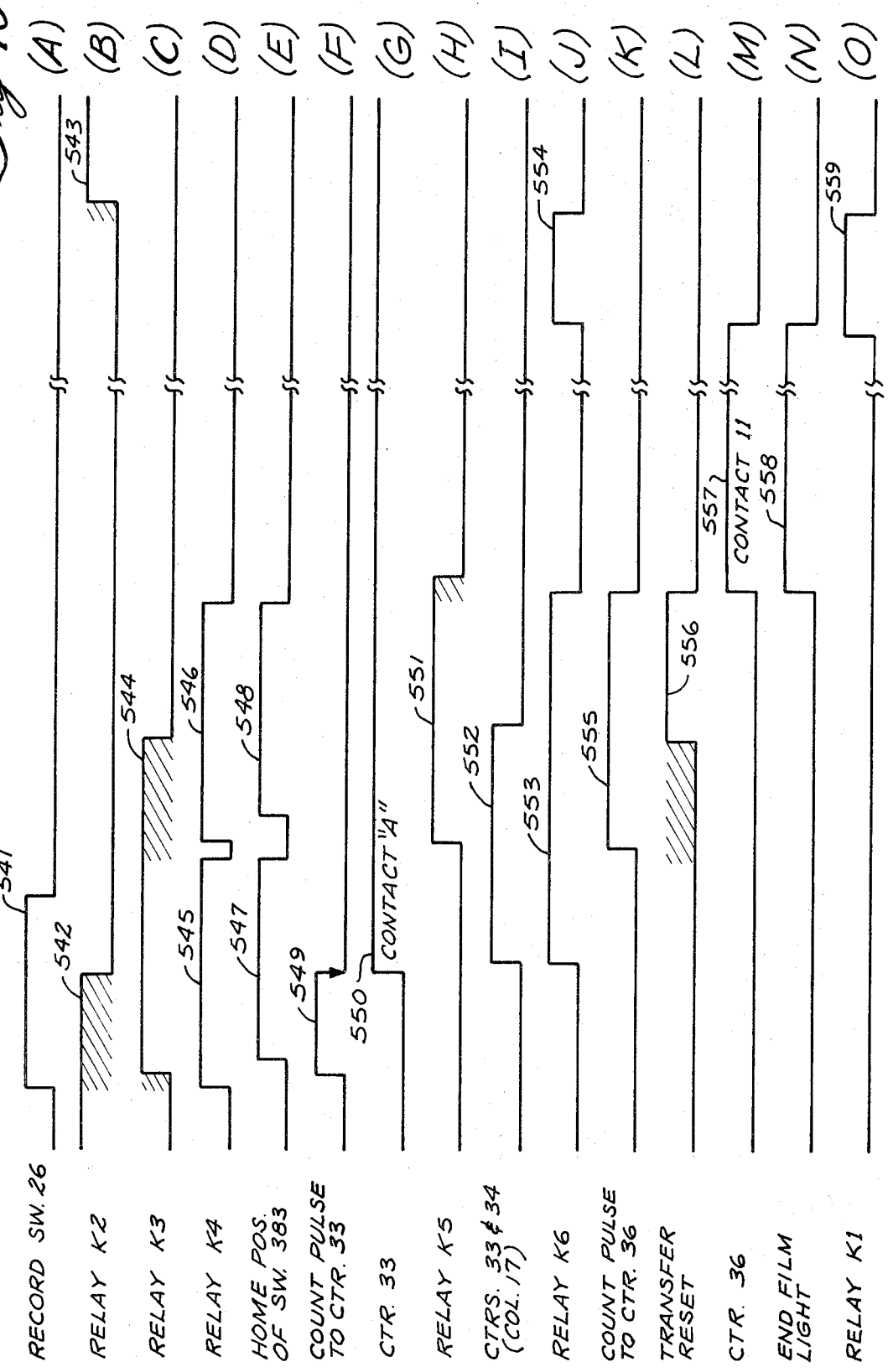

FICHE CAMERA DEVICE

CROSS-REFERENCES TO RELATED APPLICATIONS

Application Ser. No. 137,270 filed on Apr. 26, 1971 for Method Of Photographs From A Film Strip By Julian Silver.

Application Ser. No. 136,794 filed on Apr. 23, 1971 for Fiche Camera Arrangement by Dan C. Ross.

BACKGROUND OF THE INVENTION

1. This invention relates to camera devices and more particularly to fiche camera arrangements.

2. A microfiche storage system is superior to a microfilm reel storage system for many applications because the convenience in handling and copying a microfiche is much greater than that of microfilm on a reel. The accessability of photographic information on a microfiche also is more rapid than photographic information on reels. For example, an operator readily may obtain information widely distributed throughout a number of microfiches, but the retrieval rate is slowed considerably if information must be obtained from various parts of different reels of film. One type of fiche camera currently available uses relatively wide film which is several inches in width. A plurality of microphotographs are disposed adjacent to one another across the width of the wide film. The camera is expensive because a complex arrangement is needed to provide relative movement between the lens and the film. The frames are exposed sequentially across the width of the wide film as successive photographs are made. When one row of photographs is made, the film is advanced one frame along the longitudinal axis of the wide film strip, and the process is repeated to expose a plurality of photographs on a second row across the width of the wide film. This process continues until all rows of the wide film are exposed, and the wide film is then developed. The developed film is cut into longitudinal segments each of a given length, and each such segment constitutes a card or fiche. The intricate mechanisms of this complex camera require the services of a specially trained operator. Such special camera is very expensive to manufacture because it is complex, and it is expensive to operate because a highly skilled operator is essential. Consequently, the cost of each resulting fiche is expensive to the point that its use has not been widespread.

A less sophisticated camera arrangement presently available for providing a microfiche exposes frames on a film strip of conventional width such as 16 millimeter film. The film is exposed, developed and cut into strips which are placed side by side to form a fiche. As exposures are made the camera visually displays to the operator the location of the current frame as it will appear on the developed reel of microfilm. This system of identifying the location of frames by their number on a reel of film is termed film strip coordinates. It is more desirable for fiche applications to identify each frame on a reel as it is exposed in terms of the fiche number, the column number, and frame number in the column which are termed fiche coordinates. There is a need for an inexpensive camera arrangement which operates in the fiche coordinate system to provide a microfiche at low cost, and it is to this problem that the present invention is directed.

SUMMARY OF THE INVENTION

It is a feature of this invention to provide an improved fiche camera which is inexpensive to manufacture, simple to operate, and inexpensive to maintain.

It is a feature of this invention to provide an improved fiche camera arrangement which displays the fiche coordinates of the documents to the operator when the documents are recorded and which automatically prevents double exposures on the same frame.

It is a feature of this invention to provide an improved fiche camera arrangement which counts and visually presents the fiche coordinates to an operator when documents are exposed and which presents resetting of the fiche coordinate indicators whenever film is in the camera.

It is a further feature of this invention to provide an improved fiche camera arrangement which counts and displays fiche coordinates of the documents as they are recorded and which automatically skips a frame after each fiche column is exposed.

It is a feature of this invention to provide an improved fiche camera arrangement which counts and displays in the fiche coordinate system as documents are recorded and which retrieves intact the fiche coordinate count after a power failure.

It is a further feature of this invention to provide an improved fiche camera which exposes photographic frames on a film strip while simultaneously counting and displaying frames in the fiche coordinate system and which employs a control arrangement that is simple in construction, reliable and efficient in operation for automatically operating a shutter and a film transport each time a record mechanism is manually operated.

In one arrangement according to this invention a fiche camera is provided which uses film strip of a standard width. The camera includes a master reset mechanism which resets fiche coordinate counting and display devices each time film is replaced. The camera includes a film transport, a shutter, a fiche coordinate counting and display arrangement, and a control arrangement. The fiche coordinate counting arrangement includes a first counter and display device which counts the number of frames in each fiche column, and a second counter and display device responsive to the first counter counts the number of columns in a fiche. A third counter and display device responsive to the second counter counts the number of fiches per reel of film. The control arrangement includes a record mechanism which is manipulated by an operator to actuate the camera. Each time the record mechanism is manually operated, it causes the first counter, the shutter, and the film transport to be operated automatically. The control arrangement further provides for the skipping of one frame, preferably without exposure, after each fiche column is exposed, and this operation is initiated by the first counter after the last frame in each fiche column is exposed. The control arrangement also includes a device which inhibits the initiation rf a recording operation until after the preceding recording operation is finished, and this prevents double exposures on a given frame of the film strip. The control arrangement further includes a control device which is operated automatically in response to a predetermined condition of the first counter for automatically advancing the film strip by one frame after each fiche column is exposed, and this is done without incrementing the first counter. The control arrangement includes also a control device which responds to the second counter when it reaches a predetermined condition to set the second counter to the home position, and this is done after each fiche is exposed.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 1 is a perspective view of a camera according to this invention.

FIG. 2 is an exploded view of a portion of FIG. 1 which shows the camera door open.

FIGS. 7 through 10 illustrate waveforms useful in explaining tee operation of a camera according to this invention.

DESCRIPTION OF THE PREFERRED EMBODIMENT

Figure 3:
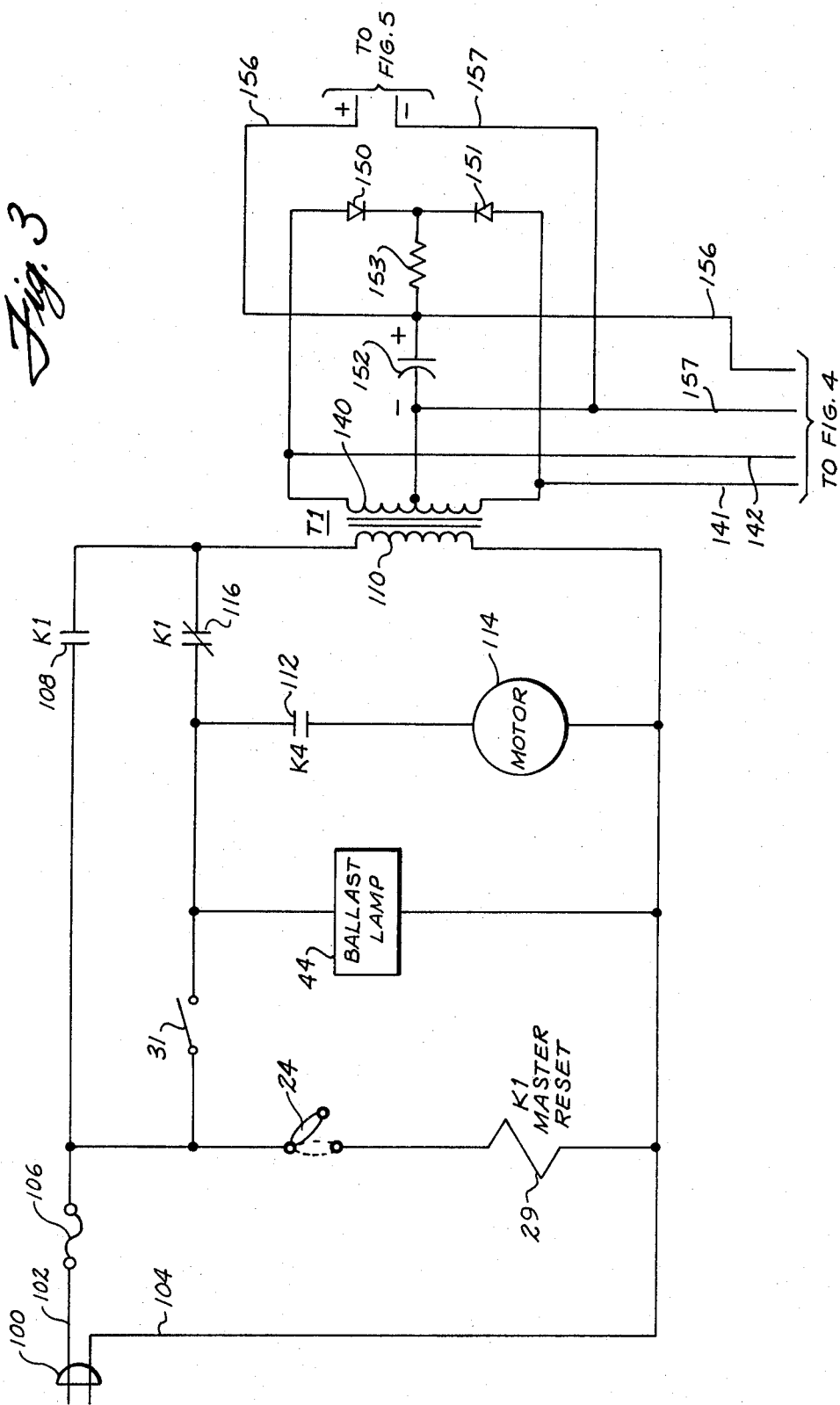
FIGS. 3 through 5 illustrate schematically electrical circuits for operating a camera according to this invention.

Reference is made to FIG. 1 which is a perspective view of the camera. It includes a base 10 with a vertical support 12 on which a camera housing 14 is disposed. The housing 14 supports the component parts of the camera. A cover 16 is mounted over the housing 14, and the cover 16 includes a door 18. The door 18 has a handle 20 for opening and closing the door 18. The door 18 is shown in the open position in FIG. 2 with a cartridge 22 inserted. A master reset switch 24 is rotated to the position shown to permit removal of the cartridge 22. The master reset switch 24 may be rotated 360°. This switch is rotated 180° from the position shown in FIG. 2 to inhibit removal of the cartridge 22.

The camera 8 in FIG. 1 includes a record switch 26 which is operated to take a picture. If the record switch 26 is depressed, and a light 28 in FIG. 5 illuminates the switch 26 in FIG. 1 during a record cycle. The camera 8 in FIG. 1 includes an on-off switch 31 which is operated to supply electrical power to the component parts of the camera. A switch 32 is operated selectively to skip frames of film when this is desired. This may be done when part of a fiche is exposed and no further recording is to be done on it. Counters 33 through 36 display the matrix position in a fiche of the frame in position to be exposed. In one arrangement according to this invention the frames of a matrix arbitrarily are lettered A through J, and the letters designate the rows of a microfiche. The next frame of a fiche to be exposed is indicated by the frame counter 33. The columns of a microfiche are designated by numbers 0 through 16, and the column number is indicated by the counters 34 and 35. A cartridge is employed which preferably holds enough film to make ten matrices or fiches. The number of the fiche being exposed is indicated by the counter 36. An end film light 37 is illuminated when the last fiche in a cartridge has been exposed. Documents to be photographed are positioned on the base 10 within an appropriate one of the index markers 41 through 43 which define rectangles. These index markers are useful in positioning different size documents to lie within the center of the photographic frame. The document to be recorded is illuminated by a lamp 44 in FIG. 3, and this lamp preferably is disposed beneath the part of the housing 14 to provide maximum illumination on the documents therebeneath. After a document is placed in proper position with respect to the appropriate one of the markers 41 through 43, the record switch 26 is depressed. This operates a shutter to expose a frame, and a motor operates to advance the film. The reduction ratio of the camera 8 preferably is 42:1 although other reduction ratios may be used. The cartridge 22 preferably employs an 8 millimeter film with a length of 50 feet. The camera 8 automatically skips a frame after 10 exposures are made. When this frame is skipped the frame counter 33 is not operated. The skipped frame is useful when converting the strip film to a matrix array of columns and rows of frames.

Figure 4:
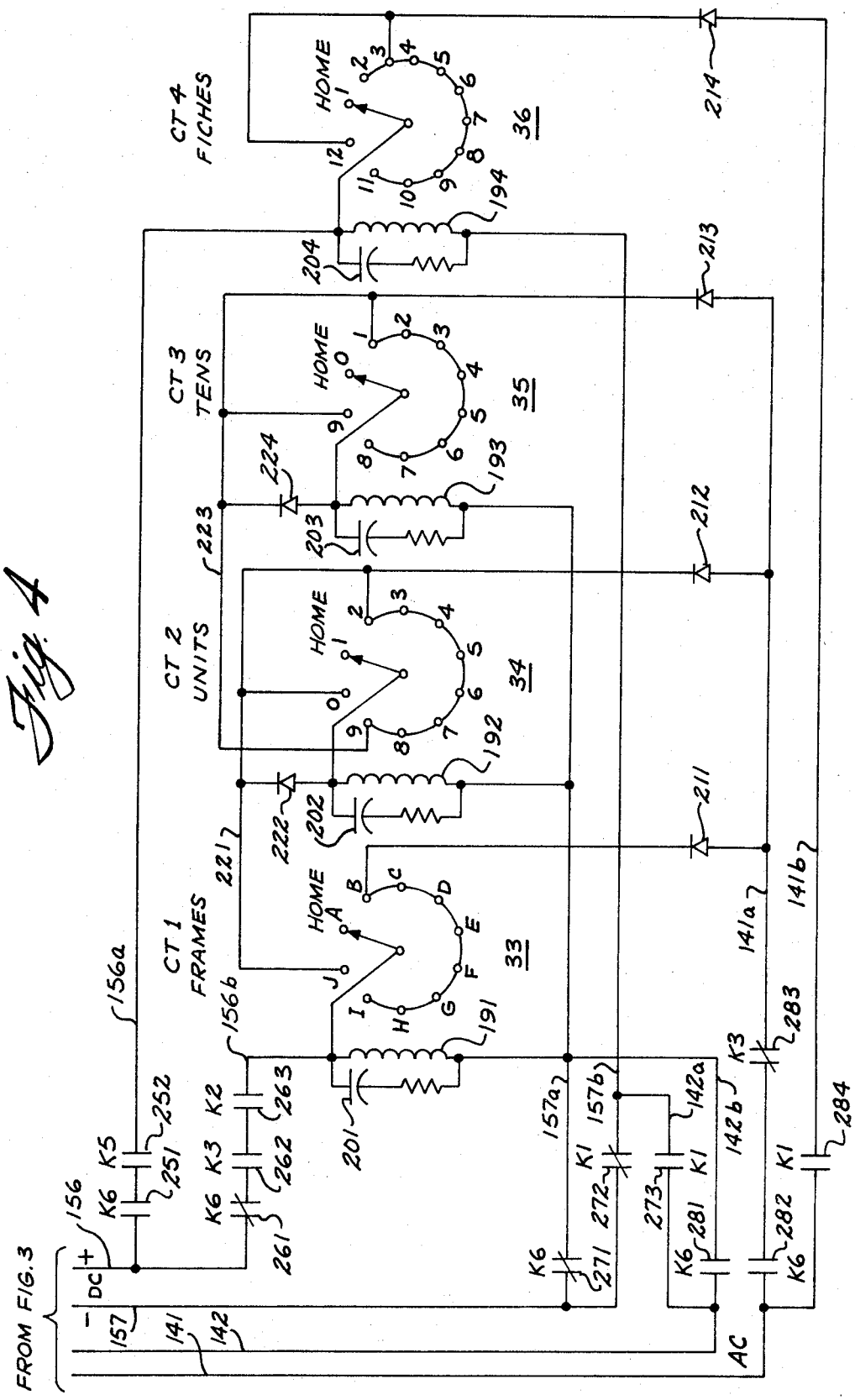
Figure 5:
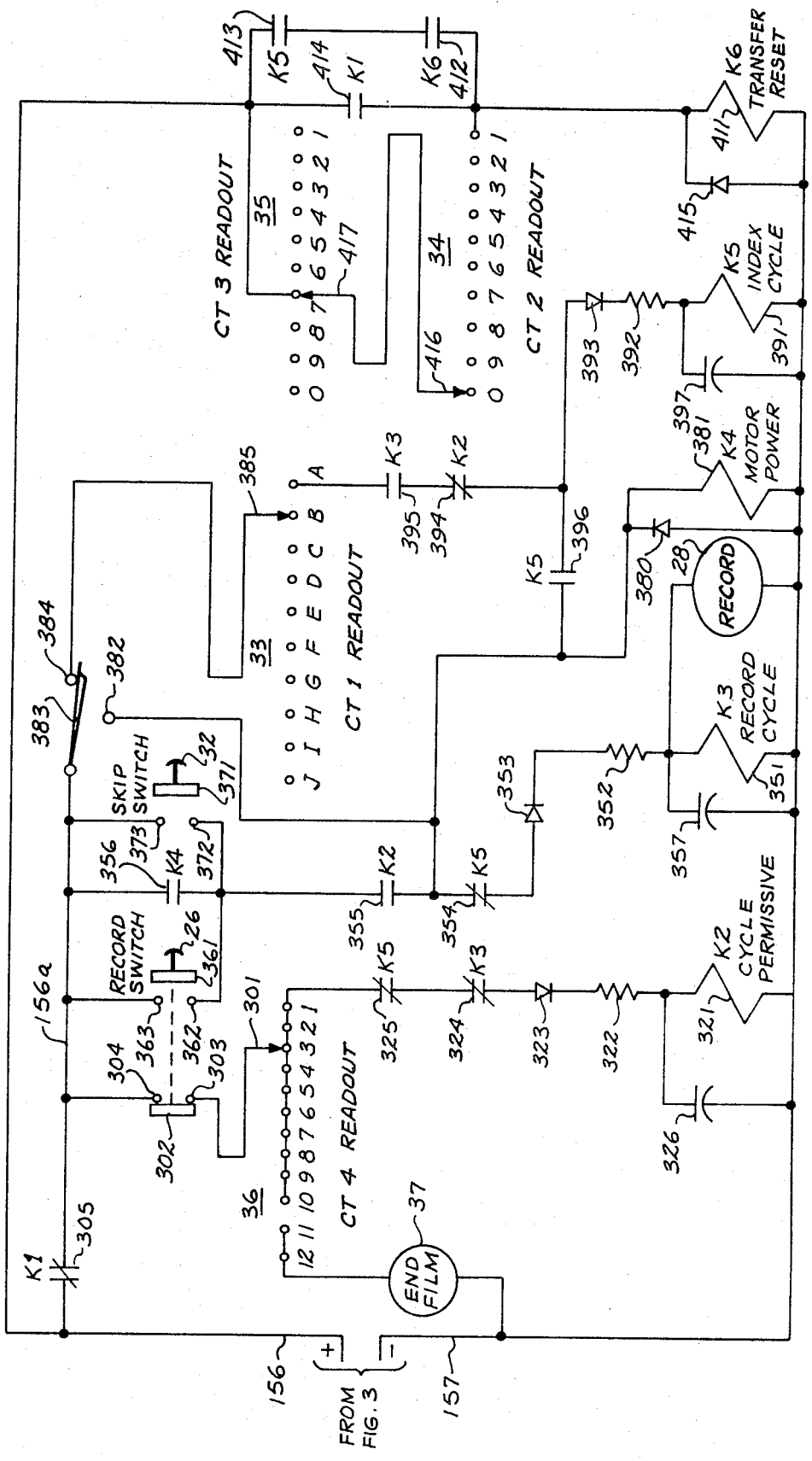

Reference is made next to FIGS. 3 through 5 for a discussion of electrical circuits employed to operate the camera 8 in FIG. 1. Referring first to FIG. 3, the power controls and power supply are shown. An electrical plug 100 is inserted in a wall socket to provide power to the camera. An alternating current signal is supplied on lines 102 and 104. The line 102 is connected to a fuse 106 which in turn is connected through a pair of contacts 108 of the master reset relay K1 to the upper side of a primary winding 110 of a transformer T1. The power line 104 is connected to the lower side of the primary winding 110. The on-off switch 31 is operated to the closed position to connect the lamp 44 across the power lines 102 and 104. When the on-off switch 31 is closed, a pair of contacts 112 of a relay K4 are connected in series with a motor 114 across the power lines 102 and 104. The motor 114 is operated to advance the film in the cartridge 22. Once the on-off switch 31 is closed, the motor 114 is controlled automatically by the operation of the relay K4. When the on-off switch 31 is closed, a pair of contacts 116 of the master reset relay K1 are connected in series with the primary winding 110 of the transformer T1 across the power lines 102 and 104. It is pointed out that the relay contacts 108 are depicted by a pair of vertical lines, and the relay contacts 116 are depicted by a pair of vertical lines with a diagonal line expending therethrough. The symbol used to depict the relay contacts 108 signifies that the contacts 108 are closed when the coil K1 of the master reset relay is energized, and the contacts 108 are open when the coil 29 of the master reset relay K1 is not energized. The diagonal line through the relay contacts 116 signifies that these contacts are closed when the coil 29 of the master reset relay K1 is not energized, and these contacts are open when the coil 29 of the master reset relay K1 is energized. This legend is employed on all relay contacts shown throughout the drawings.

Power supplied to the primary winding 110 is coupled to a secondary winding 140. Alternating current power is supplied on lines 141 and 142 to operate the counters 33 through 36 in FIG. 4. A pair of rectifier diodes 150 and 151 are connected in series across the secondary winding 140. A condenser 152 and a resistor 153 are connected in series between the center tap of the secondary winding 140 and the junction of the rectifier diodes 151 and 152. The diodes 150 and 151 permit current flow in one direction only through the resistor 153, and consequently a direct current signal is provided across the condenser 152. Direct current power is supplied on lines 156 and 157 to the counters 33 through 35 in FIG. 4 and the electrical circuits in FIG. 5. A positive voltage is supplied on the line 156, and a negative voltage is supplied on the line 157.

The master reset switch 24 occupies the position shown in FIG. 2 when a cartridge 22 is inserted and the master reset switch is rotated to the position shown by the phantom lines in FIG. 2. In this position the master reset switch 24 in FIG. 3 is open, and in this position it inhibits the removal of the cartridge 22 as shown by phantom lines in FIG. 2. If the master reset switch 24 in FIG. 2 is rotated to the position shown, it permits removal of the cartridge 22, and in this position it occupies the closed position as indicated by the dotted lines in FIG. 3. In the closed position the master reset switch connects the coil 29 of the master reset relay K1 across the power lines 102 and 104. When the coil 29 is energized, it closes the contacts 108, and supplies alternating current power to the primary winding 110 of the transformer T1. Alternating current power is then supplied on the lines 141 and 142 to reset the counters 33 through 36 in FIG. 4. Direct current power is supplied also on the lines 156 and 157 to the electrical circuits in FIG. 5. A master reset operation takes place whenever a master reset switch 24 in FIG. 3 is closed and power is applied to the lines 102 and 104, and the master reset operation takes place even if the on-off switch 31 is open. Thus, a master reset automatically takes place whenever the cartridge 22 in FIG. 2 is removed provided power is supplied. Whenever the cartridge 22 in FIG. 2 is inserted in the camera, the master reset switch 24 is rotated to the position shown by phantom lines in FIG. 2, and this switch thereby is returned to the open position in FIG. 3 to terminate the reset operation.

The on-off switch 31 in FIG. 3 must be operated to the closed position before the camera may be operated except for the reset operation. When the on-off switch 31 is closed, power is supplied continuously to the lamp 44. The lamp 44 provides illumination for documents placed on the base 10 in FIG. 1 as explained above. When the switch 31 in FIG. 3 is closed, the motor 114 receives power under control of the contacts 112 of the relay K4. When the switch 31 is closed, it supplies alternating current power to the primary winding 110 of the transformer T1 under control of the pair of contacts 116 of the relay K1. The contacts 116 of the relay K1 are closed when the coil 29 of the master reset relay K1 is not energized. When the coil 29 of the master reset relay K1 is energized, a master reset takes place, and the contacts 116 are opened as the contacts 108 are closed. When the coil 29 of the master reset relay K1 is not energized, the contacts 116 are closed as the contacts 108 are opened. Thus it is seen that alternating current power on the lines 102 and 104 is supplied to the primary winding 110 through either the contacts 108 or the contacts 116 at all times if the switch 31 is closed and the electrical plug 100 is connected to a source of alternating current power. Furthermore, alternating current power on the lines 141 and 142 and direct current power on the lines 156 and 157 is supplied to the electrical circuits in FIGS. 4 and 5 at all times when the on-off switch 31 is closed. If the on-off switch 31 is open, then power is supplied on the lines 141 and 142 and the line 156 and 157 if, and only if, the master reset switch 24 in FIG. 3 is closed which is the case when one cartridge is being removed and another is being inserted.

Next the counters 33 through 36 in FIG. 4 are described. The counters 33 through 36 are depicted as electromechanical devices, and they may be any one of several commercially available varieties. For example, the well known Veeder-Root electromechanical counters may be employed. The counters 33 through 35 are decade counters, and the counter 36 has two additional positions so that it counts to 12. The 10 positions of the counter 33 are labelled A through J. The 10 positions of the counters 34 and 35 are labelled 0 through 9. The 12 positions of the counter 36 are labelled 1 through 12. The home position is labelled for each counter. When a master reset takes place, each counter is returned to the home position. The home position for counter 33 is contact A. The home position for counter 36 is contact 1. The counters 33 through 36 have respective wiper arms. The wiper arms are connected to respective coils 191 through 194. Condensers 251 through 204 are connected across respective coils 191 through 194. Contacts B through I of the counter 33 are connected in common, and a diode 211 is connected between the line 141a and these contacts connected in common. The contacts 2 through 8 and 0 of the counter 34 are connected in common, and a diode 212 is connected between the line 141a and these common contacts. The contacts 1 through 9 of the counter 35 are connected in common, and a diode 213 is connected between the line 141a and these contacts connected in common. The contacts 2 through 12 of the counter 36 are connected in common, and a diode 214 is connected between the line 141a and these contacts connected in common. These diodes serve to rectify the alternating current signal supplied on the line 141a. Thus alternating current signals are converted to direct current signals by the diodes 211 through 214, and the direct current signals from the diodes 211 through 214 are supplied through respective coils 191 through 194 whenever the associated wipers engage the contacts connected in common of the respective counters 33 through 36. Contact J of the counter 33 is connected by a line 221 to the contacts 0 and 2 through 8 of the counter 34. A diode 222 is connected between the coil 192 and the line 221. This diode prevents current from flowing in the wrong direction through the coil 192. Contact 9 of the counter 34 is connected by a line 223 to the contacts 1 through 9 of the counter 35. A diode 224 is connected between the coil 193 and the line 223. This diode serves to prevent current from flowing in the wrong direction through the coil 193.

Contacts 251 of a relay K6 and 252 of a relay K5 are connected between the line 156 and the line 156a which in turn is connected to the winding 194. When both sets of these sets of contacts are closed, the positive DC line 156 is connected to the upper end of the winding 194. Contacts 261 of a relay K6, contacts 262 of a relay K3, and contacts 263 of a relay K2, are connected in series with a line 156b to the upper end of the winding 191. When all of these contacts are closed, the positive DC line 156 is connected to the upper end of the winding 191.

A set of contacts 271 of a relay K6 are connected between the line 157 and a line 157a. The line 157a is connected to the lower end of the windings 191 through 193. When the contacts 271 are closed, a negative DC signal is connected to the lower end of the windings 191 through 193. A set of contacts 272 of a relay K1 are connected between the line 157 and a line 157b. The line 157b is connected to the lower end of the winding 194. When these contacts are closed, a negative DC signal is connected to the lower end of the winding 194.

A set of contacts 273 of a relay K1 are connected between the AC line 142 and a line 142a which in turn is connected to the line 157b. When the contacts 273 are closed, the AC line 142 is connected to the lower end of the winding 194. A set of contacts 281 of a relay K6 are connected between the AC line 142 and a line 142b. The line 142b is connected to the lower end of the winding 191. When the contacts 281 are closed, the AC line 142 is connected to the lower end of the coil 191. Contacts 282 of a relay K6 and contacts 283 of a relay K3 are connected between the AC line 141 and a line 141a. The line 141a is connected to the diodes 211 through 213. When the contacts 282 and 283 are closed, the AC line 141 is connected to the diodes 211 through 213. Contacts 284 of a relay K1 are connected between the AC line 141 and a line 141b. The line 141b is connected to the diode 214. When these contacts 284 are closed, the AC line 141 is connected to the diode 214.

Reference is made next to FIG. 5 for a discussion of electrical control circuits employed in the camera according to this invention. The end film lamp 37 in FIG. 5 is connected to commonly connected readout contacts 11 and 12 of the counter 36. When a wiper arm 301 engages contacts 11 or 12, the end film lamp is connected through the shorting bar 302 when it engages contacts 303 and 304 to a set of relay contacts 305 of relay K1. When these contacts are closed, the end film lamp 37 is connected across the DC lines 156 and 157. Consequently, the end film lamp 37 is lighted, and this signifies that all frames in a cartridge have been exposed.

A coil 321 of a cycle permissive relay K2 is connected in series with a resistor 322, a diode 323, a set of contacts 324 of a relay K3, a set of contacts 325 of a relay K5 to the readout contacts 1 through 10 of the counter 36. A condenser 326 is connected across the relay coil 321. Whenever the contacts 324 are closed and the contacts 325 are closed, the shorting bar 302 engages the contacts 303 and 304, and the contacts 305 are closed, then the coil 321 is connected across the DC lines 156 and 157. This operates the relay K2 which signifies that a record cycle may take place, and this is referred to as a permissive cycle. All of the foregoing conditions must be present for a permissive cycle. A recording cycle then may take place. Otherwise, a recording cycle cannot take place.

A coil 351 of a record cycle relay K3 is connected in series with a resistor 352, a diode 353, a set of contacts 354 of a relay K5, a set of contacts 355 of a relay K2, and a set of contacts 356 of a relay K4 to the line 156a. When the sets of contacts 354, 355, 356, and 305 are closed, the coil 351 of the relay K3 is connected across the DC lines 156 and 157. In this event a record cycle takes place. If the contacts 356 of the relay K4 are not closed, a record cycle still may take place if the record switch 26 is operated to force a shorting bar 361 into engagement with switch contacts 362 and 363. If the record switch 326 is not operated and the contacts 356 are open, a record cycle may take place if the skip switch 32 is operated to force the shorting bar 371 into engagement with switch contacts 372 and 373 provided, of course, that the relay contacts 354, 355, and 305 are closed. A condenser 357 is connected across the relay coil 351.

A coil 381 of a motor power relay K4 is connected to a contact 382 of a motor stop limit switch 383. Switch contact 384 is connected to the wiper arm 385 of the readout contacts of the counter 33. A diode 380 is connected across the coil 381. The relay coil 381 is energized to supply power to the motor 114 in FIG. 3. The conditions which cause the operation of the relay coil 383 are described subsequently.

A coil 391 of an index cycle relay K5 is connected in series with a resistor 392, a diode 393, a set of contacts 394 of the relay K2, and a set of contacts 395 of the relay K3 to the readout contact A of the counter 33. When the wiper arm 385 engages readout contact A, the relay coil 391 is connected across the DC lines 156 and 157 provided the contacts 394, 395, and 305 are closed and the switch 383 is positioned as shown. A set of contacts 396 of the relay K5 are connected between the diode 393 and the switch contact 382. Once the coil 391 is energized, it operates the relay K5 and closes the set of contacts 396. This connects the coil 391 in parallel with the coil 381, and the coil 391 is energized thereafter as long as the coil 381 is energized. The coil 391 is energized to perform an index cycle. An index cycle causes every eleventh frame to be advanced. When an index cycle takes place, the motor 114 in FIG. 3 is operated to advance the film in the cartridge one frame without incrementing the counter 33 in FIG. 4. The counter 33 is not incremented because the energization of the coil 391 of the relay K5 opens the contacts 324, and this inhibits energization of the coil 321 of the cycle permissive relay K2. Since the relay K2 is not operated, the contacts 263 in FIG. 4 inhibit the application of a positive DC signal to the upper end of the control winding 191 of the frame counter 33. A condenser 397 is connected across the coil 391.

A coil 411 of a transfer reset relay K6 is connected in series with a set of contacts 412 of relay K6 and a set of contacts 413 of relay K5 across the DC lines 156 and 157. The coil 411 of relay K6 is connected also in series with a set of contacts 414 of relay K1 across the DC lines 156 and 157. A diode 415 is connected across the relay coil 411. The coil 411 is connected to readout contact 1 of the counter 34. A wiper arm 416 of the readout contacts of the counter 34 is connected to a wiper arm 417 of the readout contacts of the counter 35. The positive DC line 156 is connected to the readout contact 7 of the counter 35. The counters 34 and 35 count the columns of a photographic matrix.

There are 16 columns per fiche. When the column count reaches 17, it is necessary to reset the column counters 34 and 35 to the home position so that they may count the columns of the next fiche. Therefore, a transfer reset takes place when the column counters reach the count of 17. In this case the wiper arm 416 engages the readout contact 1 of the counter 34, and the wiper arm 417 engages readout contact 7 of the counter 35. This causes a short circuit to occur across the relay contacts 414, and the positive DC line 156 is connected through the readout contact 7 of the counter 35, the wiper arm 417, the wiper arm 416, and readout contact 1 of the counter 34. Consequently DC current is supplied through the diode 413, the resistor 412 and the coil 411 to the negative DC line 157.

Figure 6:
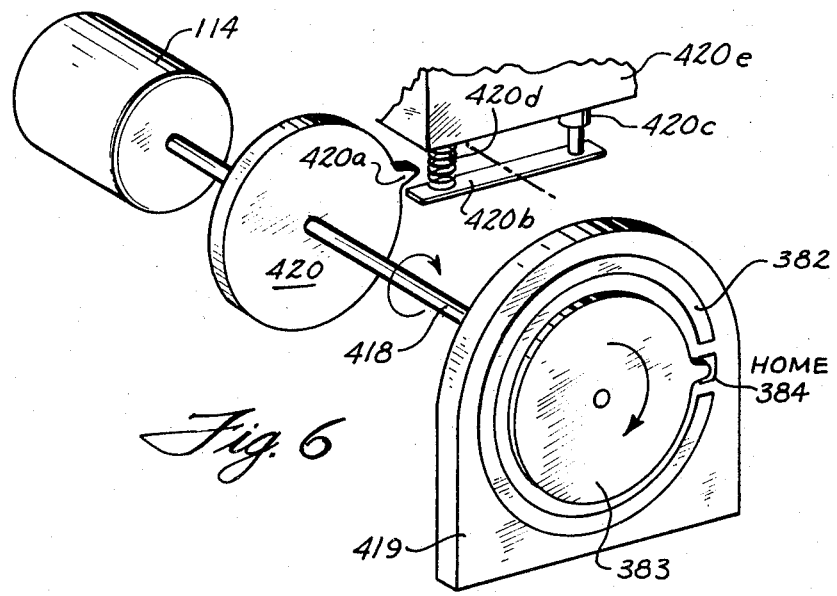
FIG. 6 illustrates one arrangement for operating the shutter of a camera according to this invention.

The switch 383 in FIG. 5 is a rotary switch preferably of the type illustrated in FIG. 6. Corresponding parts of the switch in FIGS. 5 and 6 are labelled with the same reference numerals. The switch in FIG. 6 includes a circular member 383 which turns with the shaft of the motor 114 in FIG. 3. When the switch member or blade 383 in FIG. 6 engages the contact 384, the motor 114 stops, and this is the home position. The motor 114 stops because tee coil 381 of relay K4 in FIG. 5 is de-energized, and this opens the contacts 112 in FIG. 3. When the coil 381 of the relay K4 in FIG. 5 is energized, this closes the contacts 112 in FIG. 3, and the motor is operated. When the motor shaft 418 in FIG. 6 turns, it moves the switch blade 383 from the contact 384 into engagement with the contact 382 which is a circular member disposed on a stationary base 419 made of insulation material. The switch blade 383 in FIG. 6 engages the circular contact 382 throughout most of a revolution, e.g. 350°, and direct current is supplied through the contact 382 to energize the coil 381 of relay K4 in FIG. 5. As soon as the switch blade 383 in FIG. 6 disengages the contact 382 and engages the contact 384, the coil 381 in FIG. 5 is de-energized, thereby opening the contacts 112 in FIG. 3 and terminating power to the motor 114.

Disposed on the motor shaft 418 in FIG. 6 is a circular member 420 which turns with the shaft and operates the shutter of the camera 8 in FIG. 1. The circular member 420 has a projection 420a which engages a pivoted member 420b. The projection 420a engages the pivoted member 420b as soon as the switch blade 383 leaves the home position, and a shutter arm 420c is actuated as the pivoted member 420b is forced downwardly against the tension of a spring 420d. The shutter 420e is illustrated schematically. When the projection 420a passes the pivoted member 420b, the member 420b is returned by the spring 420d to the position shown in FIG. 6. With this arrangement the shutter 420e is actuated each time the motor makes one revolution. It is desirable for some applications to be able to inhibit operation of the shutter when the motor is operated in certain instances. For example, indexing cycles are used to skip every 11th frame, and these frames are used in the fiche making process. The film is cut into strips to form a matrix, and the cut is made through the film in the 11th frame. It is desirable for identification purposes to leave the 11th frames blank or unexposed so they readily may be identified visually after the film is developed.

Figure 6A:
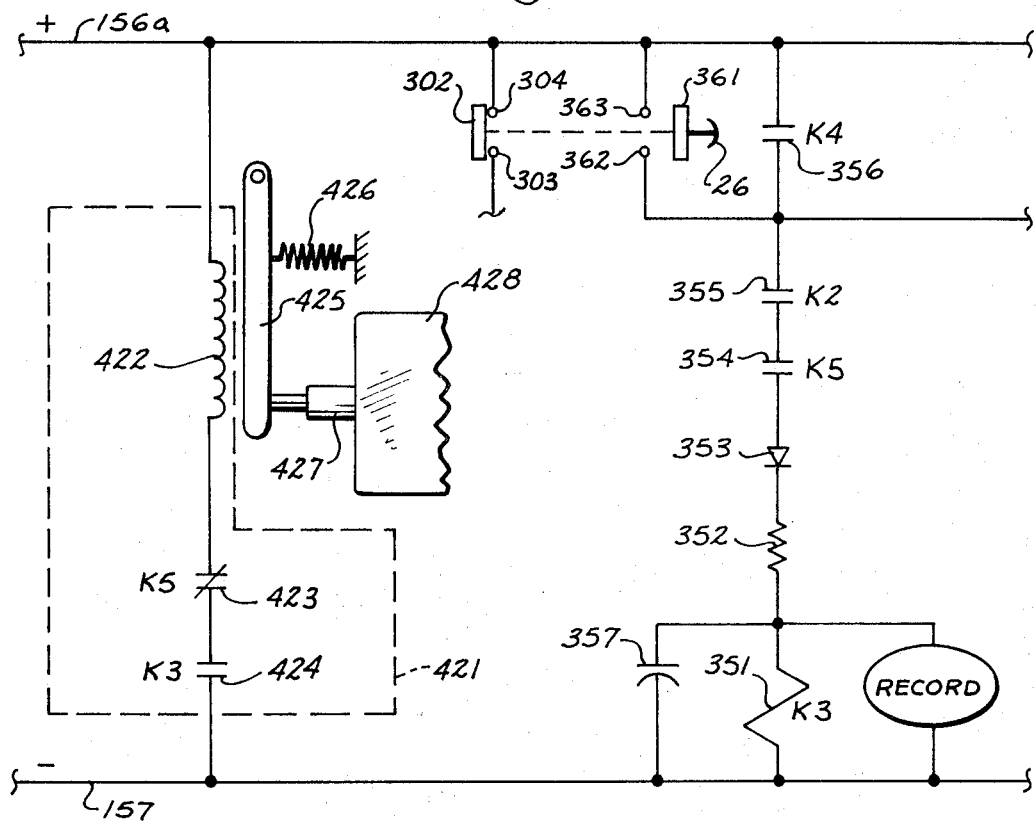
FIG. 6a shows an alternative arrangement for operating the shutter of a camera according to this invention.

An alternative arrangement is illustrated in FIG. 6a for preventing the operation of the shutter except when the record switch 26 is operated, and this permits film to be advanced by the motor 114 in FIG. 3 when frames are selectively skipped by operating the skip switch 32 in FIG. 5 or during index cycles. Referring next to FIG. 6a, a modification is shown which may be incorporated in the control circuit shown in FIG. 5. The record switch 26 and the relay K3 plus the associated circuitry in FIG. 5 is shown in FIG. 6a. The same reference numerals for these parts are used in FIGS. 5 and 6a. A control circuit 421 is added. The control circuit 421 includes a solenoid coil 422, a set of relay contacts 423 of the relay K5, and a set of relay contacts 424 of the relay K3. Whenever the relay K5 is de-energized and the relay K3 is energized, current flows from the positive DC line 156a to the negative DC line 157 through the solenoid coil 422, the contacts 423, and the contacts 424. A movable member 425, pivoted at its upper end, is forced to the right against the tension of a spring 426. This causes the shutter actuating arm 427 to move to the right and operate the shutter 428 which is shown schematically. Actuation of the arm 427 operates the shutter mechanism to expose the film for a selected period of time. When a record cycle terminates, the relay K3 in FIG. 6a is de-energized, and this opens the set of contacts 424 thereby terminating the flow of current through the solenoid winding 422. The compressed spring 426 forces the pivoted member 425 to the left thereby to restore it to the home position. The member 425 is shown in the home position in FIG. 6a. The control circuit 421 in FIG. 6a is substituted for the circular member 420 in FIG. 6 whenever it is desirable to inhibit recording cycles as the motor is operated to advance the film.

Next the operation of the motor power relay K4 in FIG. 5 is discussed. The coil 381 energized under any one of several conditions. First, if the cycle permissive relay K2 is energized, the relay contacts 355 are closed, and the coil 381 is connected to the contact 362 of the record switch 26, the contact 372 of the skip switch 32, and to the lower contact of the pair of contacts 356. If the contacts 305 of the relay K1 are closed, as normally is the case, positive DC potential is supplied to the line 156a. If the record switch 26 is operated, the shorting bar 361 engages the contacts 362 and 363 thereby to energize the motor power relay 381. The motor 114 in FIG. 3 makes one turn and stops under control of the switch 383 in FIG. 6. Alternatively, if the skip switch 32 is operated, the shorting bar 381 engages the contacts 372 and 373, and the relay coil 381 is energized thereby to cause the motor to complete one turn under control of the switch 383 in FIG. 6. If the relay coil 381 is energized by operation of either the record switch 26 or the skip switch 32, the contacts 356 are closed, and the relay coil 381 continues to be energized even though the switch 326 or the switch 32 is released and de-activated. The DC power continues to energize the coil 381 until the rotary switch 383 in FIG. 6 terminates the flow of current to the coil 381 by engaging the contact 384.

Second, the coil 383 of the motor power relay K4 may be energized whenever the wiper arm 385 of the counter 33 engages readout contact A. In this case current from the positive DC line 156a flows through the switch 383, the contact 384, the wiper arm 385, the readout contact A of the counter 33, the relay contacts 395 when the relay K3 is operated, the relay contacts 394 when the relay K2 is not operated, the diode 393, the resistor 292 and the coil 391 to the negative DC line 157. When the relay coil 391 is energized, the contacts 396 are closed, and DC power is supplied to the relay coil 381 of the relay K4. As soon as the relay coil 381 is energized, the contacts 112 in FIG. 3 are closed, and the motor 114 is operated. As soon as the motor rotates the switch 383 in FIG. 6 into engagement with the contact 382, power is maintained continuously thereafter to the relay coils 381 and 391. More specifically, current flows from the positive DC line 156a in FIG. 5 through the switch 383, the contact 382, through the coil 381 to the negative DC line 157. Current from the switch contact 382 is supplied also through the closed contacts 396, the diode 393, the resistor 392, and the coil 391 to the negative DC line 157. Thus the coil 391 continues to be energized even though the wiper arm 385 may move from readout contact A to readout contact B of the counter 33. Thus it is seen that the relay coil 381 of the motor power relay K4 in FIG. 5 is operated to advance the film in the cartridge whenever the record switch 26 in FIG. 5 is operated, the skip switch 32 is operated, or the wiper arm 385 of the counter 33 engages readout contact A.

It is pointed out by way of summary that the relay K1 in FIG. 3 is operated when a new cartridge is inserted. The relay K2 in FIG. 5 is operated to indicate that a permissive cycle is available. The relay K3 in FIG. 5 is operated whenever a record cycle takes place in response to operation of the record switch 26 or operation of the skip switch 32. In either event the counters in FIG. 4 are operated. The motor power relay K4 in FIG. 5 is operated to energize the motor 114 in FIG. 3 and advance the film in the cartridge 22 in FIG. 2. The index cycle relay K5 in FIG. 5 is operated to energize the relay K4 and operate the motor 114 in FIG. 3 to advance the film in the cartridge 22 in FIG. 2 every 11th frame. The counters in FIG. 4 are not operated during an index cycle. The transfer reset relay K6 in FIG. 5 is operated whenever the column counters 34 and 35 must be reset, and this takes place before commencing the exposures of a new fiche.

It is appropriate to discuss at this point the interrelationship of the various relays K1 through K6. The master reset relay K1 can be operated only when the switch 24 is manipulated as one cartridge is being replaced by another. During a master reset operation the contacts 305 of the relay K1 in FIG. 5 are open, and the relays K2 through K5 cannot be energized since they are disconnected from the positive DC line 156. The transfer reset relay K6 may be energized during a master reset operation. However, the transfer reset operation returns the counters 34 and 35 to the home position. The master reset operation returns all of the counters 33 through 36 to the home position. Since the master reset operation and the transfer reset operation perform the same result on counters 34 and 35, there is no conflict.

The relays K2 through K5 may be operated if, and only if, a master reset operation is not taking place. The cycle permissive relay K2 may be operated if the fiche counter 36 occupies any position from one to 10 and the record cycle relay K3 and the index cycle relay K5 are not operated. The record cycle relay K3 may be operated if, and only if, the permissive cycle relay K2 is operated and the index cycle relay K5 is not operated. The motor power relay K4 is operated whenever either the record cycle relay K3 or the index cycle relay K5 is operated. The index cycle relay K5 may be operated if, and only if, the counter 33 is in position A, the record cycle relay K3 is operated, and the cycle permissive relay K2 is not operated.

The operation of the electrical circuits in FIGS. 3 through 5 are discussed next. Let it be assumed for purposes of illustrating the operation of the counters 33 through 36 in FIG. 4 in various types of cycles that these counters are reset to the home position. The frame counter 33 is advanced by a DC signal applied to the control winding 191 whenever a record cycle takes place, and a record cycle takes place each time the record switch 26 in FIG. 5 or the skip switch 32 is operated while sets of contacts 354, 355, and 305 are closed. The timing relationship for the various waveforms during a counting operation in the counter 33 are illustrated in FIG. 7. In curve A the waveform 431 represents the period of time during which the record switch 26 in FIG. 5 is depressed. In curve B the waveforms 432 and 434 represent the time that the relay K2 is energized. The crosshatched portions throughout the various curves signify that the initiation or termination of an event may take place at any time during the crosshatched area. In this connection it is pointed out that the condensers across the relay coils of the relays K2, K3, and K5 delay the time of turning on or turning off of these relays. Relays K4 and K6, on the other hand, does not have a condenser connected thereacross, and they are operated to the onstate or the offstate very rapidly. The operation of the relay K3 is illustrated by the waveforms 434 and 435 in curve C of FIG. 7. The relay K4 comes on at the times indicated by the waveforms 436 and 437 in curve D of FIG. 7. The home position of the switch 384 in FIGS. 5 and 6 is shown by the waveforms 438 and 439 of curve E in FIG. 7. Pulses applied to the control winding 191 of the counter 33 are illustrated by the waveforms 440 and 441 of curve F in FIG. 7. The DC pulse 440 operates the counter 33 in FIG. 4, and this pulse advances the counter when the pulse 440 terminates. The counter is advanced from the home contact A as shown by the waveform 442 in curve G of FIG. 7 to contact B as indicated by the waveform 443 in curve H of FIG. 7. When the waveform 441 in curve F of FIG. 7 terminates, the counter 33 is advanced to position C as indicated by the waveform 444 in curve I of FIG. 7. Curve J of FIG. 7 signifies that the index cycle relay K5 is not operated during the time period under consideration.

The depression of the record switch 26 as represented by the waveform 430 in curve A of FIG. 7 is effective to generate the DC pulse 440 in curve F which advances the counter 33 from contact A as represented by the waveform 442 in curve G to contact B as represented by the waveform 443 in curve H. Likewise, the depression of the record switch 26 as represented by the waveform 430 in curve A results in the DC pulse represented by the waveform 441 in curve F which advances the counter 33 from contact B as represented by the waveform 443 in curve H to contact C as represented by the waveform 444 in curve I. The depression of the record switch 26 in FIG. 5 may be for a relatively long period or a relatively short period as indicated by the waveforms 430 and 431. It is emphasized that the camera 8 in FIG. 1 cannot double expose any frame because a record cycle is not terminated until the record switch is released and the relay K2 is reactivated. In this connection it is pointed out that the waveform 430 in curve A of FIG. 7 must terminate before the waveform 433 in curve B is initiated. This is verified by noting in FIG. 5 that once a record cycle is initiated, the relay K3 is energized, and the relay K2 cannot be re-energized until the relay K3 is de-energized. More specifically, the contacts 324 are opened when the record cycle relay K3 is de-energized and the contacts 24 are closed again.

Reference is made next to FIG. 8 for a discussion of the manner in which an index cycle takes place. During an index cycle a frame is advanced, but the frame counter 33 in FIG. 4 is not incremented. The operation of the record switch 26 in FIG. 5 is indicated by the waveform 451 in curve A. The operation of the relay K2 is indicated by the waveforms 452 and 453 in curve B. The operation of the relay K3 is indicated by the waveforms 455 and 456 in curve D of FIG. 8. The home position of the switch 383 in FIGS. 2 and 5 is signified by the waveforms 457 and 458 in curve E of FIG. 8. The count pulse supplied to the winding 191 of counter 33 in FIG. 4 is indicated by the waveform 459 in curve F of FIG. 8. The wiper arm of the counter 33 in FIG. 4 engages contact J during the time period indicated by the waveform 460 in curve G of FIG. 8, and the wiper arm of the counter 33 in FIG. 4 steps to the next position thereby engaging contact A for the time period indicated by the waveform 461 in curve H of FIG. 8. The relay K5 in FIG. 5 is operated during the time period indicated by the waveform 462 of curve I in FIG. 8.

The wiper arm of the counter 33 in FIG. 4 engages contact J as shown by the waveform 460 in curve G of FIG. 8 when the record switch 26 is depressed as shown by the waveform 451 in curve A of FIG. 8. Operation of the record switch 26 causes the relay K3 to be energized as shown by the waveform 454 in curve C of FIG. 8 and the relay K2 to be de-energized as shown by the waveform 452a in curve B of FIG. 8. Operation of the record switch 26 in FIG. 5 causes the relay K4 to be energized as shown by the waveform 455 in curve D of FIG. 8. The motor 114 in FIG. 2 is operated to rotate one turn as indicated by the waveform 457 in curve E of FIG. 8. When the switch member 383 in FIG. 2 returns to the home position and engages the contact 382, the pointer 385 in FIG. 5 engages readout contact A, and the positive DC signal on the line 156a passes through the wiper arm 385, readout contact A, contacts 395 of the relay K3, the contacts 394 of the relay K2, and through the coil 391 of the relay K5 to the negative DC line 157. When the coil 391 of the relay K5 is energized, it closes the contacts 396, and the coil 381 of the relay K4 is connected in parallel with the coil 391 of the relay K5. Current then flows through the relay coil 381 to operate the motor 114 through another turn as indicated by the waveform 456 in curve D of FIG. 8. The switch 383 is in the home position for a brief interval of time defined by the waveform 457a in curve E of FIG. 8, and the switch member 383 in FIG. 6 is in engagement with the circular contact 382 for the time periods indicated by the waveforms 457 and 458 in curve E of FIG. 8. Thus it is seen that the motor 114 makes one turn during the time period indicated by the waveform 455 in curve D of FIG. 8, and the counter 33 is incremented by a DC pulse 459 in curve F of FIG. 8 thereby to advance this counter from contact J as shown by the waveform 460 in curve G of FIG. 8 to contact A as shown by the waveform 461 in curve H of FIG. 8. As soon as the relays K4 and K5 are energized as shown by the respective waveforms 456 in curve D of FIG. 8 and 462 in curve I, the switch member 383 in FIG. 2 commences to rotate, and it engages the circular contact 382 in FIG. 6. For a brief interval of time the rotary switch member 383 in FIG. 6 engages both of the contacts 382 and 384, and power from the positive DC line 156a is supplied through both of the contacts 382 and 384 to the energized relays K4 and K5 of FIG. 5. As the switch member 383 in FIG. 2 rotates further, it engages the contact 382 only, and power from the positive DC line 156a is supplied through the contact 382 to the energized relays K4 and K5 of FIG. 5. As soon as the switch member 383 returns to the home position in FIG. 2 in engagement with the contact 384, power on the positive DC line 156a is no longer supplied to the relays K4 and K5 in FIG. 5 because contact 382 in FIG. 5 is disengaged and the set of contacts 395 are opened. In this connection it is pointed out that the relay K3 is de-energized as indicated by the waveform 454 in curve C of FIG. 8 during the revolution of the motor 114 indicated by the waveform 456 in curve D of FIG. 8. It is pointed out that the relay K3 in FIG. 5 is de-energized by the opening of the contacts 354 when the relay K5 is energized. It is pointed out that during the index cycle indicated by the waveform 462 in curve I of FIG. 8 that no count pulse for the counter 33 appears on the curve F, and the counter 33 is not incremented when the motor makes one revolution during an indexing cycle. Thus the motor advances the film in the cartridge 22 in FIG. 2 by one frame, and this skipped frame is exposed by operation of the shutter 420e in FIG. 6. This indexing cycle is repeated on every 11th frame. It is desirable in some instances to leave blank or unexposed the skipped frames of each indexing cycle. For this purpose the alternative arrangement for operating the shutter shown in FIG. 6A is preferred. In this case the shutter 428 in FIG. 6A is not operated during an indexing cycle because the set of contacts K3 in FIG. 5 are open. With the alternative embodiment of FIG. 6A every 11th frame skipped by the indexing cycle is not exposed, and hence such frames are blank or transparent when the film is developed.

Reference is made next to FIG. 9 for a discussion of the events which take place when the last frame in a fiche is exposed. When this occurs it is necessary to advance the frame counter, skip an additional frame by performing an index cycle, reset the column counters to the home position by performing a transfer reset cycle and advance the fiche counter. The waveforms 501 through 511 of curves A through H in FIG. 9 signify the performance of the same events which are described with reference to curves A through I in FIG. 8. The waveform 501 in curve A of FIG. 9 signifies the operation of the record switch 26. The waveforms 502 and 503 in curve B indicate the operation of the relay K3. The waveforms 505 and 506 in curve D indicate the successive cycles of operation of the relay K4, and the motor 114 in FIG. 3 is operated to complete two successive turns as explained above. The operation of the rotary switch 383 is indicated by curve E, and the waveforms 507 and 508 indicate when the switch 383 is off of the home position. The DC pulse supplied to the winding 191 of the counter 33 in FIG. 4 during the first revolution of the motor 114 is indicated by the waveform 509 in curve F. The pulse 509 advances the wiper arm of the counter 33 from contact J to contact A when the pulse 509 terminates. The waveform 510 in curve G of FIG. 9 illustrates when contact A is engaged. The DC signal supplied to the control winding 191 of the counter 33 is supplied also to the control winding 192 of the counter 34 because the upper end of the winding 191 is connected through the wiper arm to contact J of the counter 33 which is connected by the line 221 to the common contacts 2 through 8 of the counter 34, through the wiper arm to the upper end of the control winding 192, through the winding 192, and along the line 157a to the lower end of the coil 191. Thus it is seen that current flows through the control winding 191 as well as the control winding 192. Consequently, when the DC pulse 509 in curve F of FIG. 9 terminates, the counters 33 and 34 are advanced. The counter 33 advances from contact J to contact A as the counter 34 advances from contact 6 to contact 7. It is pointed out that the counters 34 and 35 engage respective contacts 6 and 1 when the 10th frame of column sixteen is exposed, and the counter 34 is advanced to contact 7 upon termination of the recording cycle for the 10th frame of the 16th column. Therefore, the readout contacts 1 and 7 of respective counters 34 and 35 in FIG. 5 are engaged by respective wiper arms 416 and 417, and this causes current to flow from the positive DC line 156 to the transfer reset relay case 6. Energization of the relay K6 is illustrated by the waveform 513 of curve J in FIG. 9. Since the relay K6 is energized, a transfer reset cycle takes place to advance the counters 34 and 35 to the home position after the relay K3 is de-energized. The transfer reset operation takes place during the time indicated by the waveform 517 in curve N of FIG. 9. The counter 33 also receives the rectified AC signals from the lines 142b and 141a, but it is not operated since it is in the home position at this time. The readout contacts 1 and 7 of respective counters 34 and 35 in FIG. 5 are engaged during the time indicated by the waveform 512 in curve I of FIG. 9. As soon as the counters 34 and 35 are advanced in response to the first rectified AC signal, the DC power to the transfer reset relay K6 in FIG. 5 is no longer applied through the readout contacts 1 and 7 of the respective counters 34 and 35, but it is still applied through the contacts 413 of relay K5 in series with contacts 412 of relay K6. This keeps the coil 411 of relay K6 energized until the contacts 413 of the relay K5 opens at the termination of the index cycle which point in time is indicated by the falling or trailing edge of the waveform 511 in FIG. 9. The purpose of the rectifier diodes 415 and 380 in FIG. 5 is to prevent contact arcing upon removal of power from the relay coils 411 and 381, respectively.

It is necessary to increment the fiche counter 36 when an index cycle and a transfer reset cycle take place simultaneously. These two cycles take place simultaneously at the end of each fiche. When the index cycle relay K5 and the transfer reset relay K6 are operated simultaneously, the upper end of the control winding 194 of the counter 36 in FIG. 4 is connected through contacts 251 and 252 to the positive D C line 156, and the lower end of the winding 194 is connected through the contacts 272 to the negative DC line 157. The DC current through the control winding 194 advances the fiche counter 36. If the fiche counter 36 is in the home position when this operation takes place, it is advanced from contact 1 to contact 2. The DC pulse through the control winding 194 is indicated by the waveform 514 in curve K of FIG. 9. The waveform 515 in curve L of FIG. 9 illustrates that the counter 36 engages contact 1 when the DC pulse 514 is received. Upon termination of the DC pulse 514, the counter 36 advances from contact 1 to contact 2. The waveform 516 in curve M of FIG. 9 illustrates when the count of 36 engages contact 2. As the counters 33 through 35 are repeatedly operated when exposing sequential frames composing successive fiches, the fiche counter 36 is periodically incremented. When the last frame of the 10th and last fiche is exposed, the maximum number of frames in a cartridge have been exposed, and the sequence of events surrounding this condition are discussed next.

Reference is made next to FIG. 10 for a discussion of the events which take place at the end of the film when the last or 10th frame of the 16th column of fiche 10 is exposed. Also discussed are the events which take place thereafter when the exposed cartridge is replaced by a new cartridge. The waveforms 541 through 557 in curves A through M of FIG. 10 describe events which are similar to the events described with reference to waveforms 501 through 517 of curves A through N of FIG. 9. The waveform 541 of curve A in FIG. 10 represents the time during which the record switch 26 is operated. The waveforms 542 and 543 in curve B in FIG. 10 indicate the time when the relay K2 is energized, and the waveform 544 in curve C represents the time when the relay K3 is on. The waveforms 545 and 546 in curve D of FIG. 10 represent successive energization cycles of the relay K4. The waveforms 547 and 548 in curve E of FIG. 10 represent the times when the switch 383 is operated from the home position. The waveform 549 in curve F of FIG. 10 illustrates the count pulse which advances the counter 33 in FIG. 4. This causes the counter 33 to advance the wiper arm in FIG. 4 from contact J to contact A. The time in which this relay engages contact A is shown by the waveform 550 in curve G of FIG. 10. The counter 33 is thus returned to the home position as soon as the 10th frame of the 16th column is exposed. It is recalled that the pulse 549 of curve F in FIG. 10 operates the units counter 34 in FIG. 4 thereby to advance the wiper arm from engagement with contact 6 to contact 7. The waveform 552 in curve I of FIG. 10 shows the time when the readout contacts 1 and 7 of respective counters 34 and 35 engage respective wiper arms 416 and 417 in FIG. 5. The waveform 551 of curve H in FIG. 10 signifies when the relay K5 is energized. The waveforms 553 and 554 of curve J in FIG. 10 indicate when the relay K6 is energized. It is recalled that the fiche counter 36 in FIG. 4 receives a DC pulse through the control winding 194 whenever the index cycle K5 and the transfer reset relay K6 are energized simultaneously. This DC pulse is illustrated by the waveform 555 in curve K of FIG. 10. The fiche counter 36 in FIG. 4 is thereby advanced, and the wiper arm moves from engagement with contact 10 into engagement with contact 11. The waveform 557 in curve M of FIG. 10 indicates when the fiche counter engages contact 11. The waveform 556 of curve L in FIG. 10 signifies when a transfer reset operation causes the column counters 34 and 35 to be advanced by rectified AC signals to their respective home positions as explained earlier. Since the wiper arm of the fiche counter 36 in FIG. 4 engages contact 11, its readout wiper arm 301 in FIG. 5 engages readout contact eleven. When the readout wiper arm 301 in FIG. 5 engages readout contact 11, the relay K2 is de-energized, and the end film lamp 37 is energized. Since the cycle permissive relay K2 is de-energized, no further recording operations may take place even if the record switch 26 is depressed because the contacts 355 are opened and remain open until the fiche counter is advanced and the wiper arm 301 in FIG. 5 engages readout contact 1. As long as the wiper arm 301 in FIG. 5 remains in engagement with readout contacts 11 or 12, the end film lamp 37 remains energized. This lamp is energized by a current which flows from the positive DC line 156 through the closed contacts 305. The contact 304, the shorting bar 302, the contact 303, the wiper arm 301, the readout contacts 11 and 12, and through the end film lamp 37 to the negative DC line 157. The illuminated end film light 37 indicates to the operator that the cartridge in the camera 8 in FIG. 1 has been exposed completely and a replacement cartridge is needed. The door 20 is opened as shown in FIG. 2. The switch 24 then is rotated from the position shown by the phantom lines in FIG. 2 to the open position shown. The exposed cartridge 22 is removed and another inserted in its place. The switch 24 in FIG. 2 is then rotated from the position shown to the position indicated by the phantom lines. When the switch 24 in FIG. 2 is rotated to the position shown for cartridge replacement, a master reset operation takes place because the switch 24 in FIG. 3 is then closed thereby to energize the master reset relay K1. When the switch 24 in FIG. 2 is rotated to the position shown by the phantom lines, this terminates the master reset operation because this switch is returned to the open position in FIG. 3 thereby de-energizing the master reset relay K1. The time that the master reset relay K1 is energized is indicated by the waveform 559 in curve O of FIG. 10. When the master reset relay K1 in FIG. 3 is energized, various events take place simultaneously. One, the contacts 116 in FIG. 3 are opened thereby to disconnect AC power on the lines 102 and 104 from the motor 114. Thus the motor 114 cannot be operated during the time that a cartridge is being replaced. The AC power on the lines 102 and 104 is supplied through the closed contacts 108 across the primary winding 110 during the time a master reset operation takes place, and both AC and DC power is provided to the circuits in FIGS. 4 and 5. During the time a master reset operation takes place the relay contacts 305 in FIG. 5 are opened, and the relays K2 through K5 cannot be energized. However, the transfer reset relay K6 is energized at this time because the contacts 414 are closed. The transfer reset relay K6 is thereby connected across the DC lines 156 and 157. The transfer relay K6 in FIG. 5 remains energized throughout the duration of the master reset operation as indicated by the waveform 554 of curve J in FIG. 10. It is noted that the waveform 554 in curve J of FIG. 10 is co-extensive in time with the master reset operation indicated by the waveform 559 in curve 0 of FIG. 10. The column counters 34 and 35 are advanced to the home position by rectified AC signals when the relay K6 is energized. When the relay K6 is energized, the contacts 281 and 282 in FIG. 4 are closed. The contacts 283 of the relay K3 are closed because this relay is de-energized. Therefore, the AC power is supplied from the line 142 in FIG. 4 through the contacts 281, and on the line 142b to the lower end of the control windings 191 through 193 of respective counters 33 through 35. The AC power on the line 141 is supplied through the closed contacts 282, closed contacts 283, on the line 141a, through the diodes 211 through 213 to the counters 33 through 35. The counter 33 is in the home position as explained above. The wiper arm of counter 34 engages contact 7, and the rectified AC signal from the diode 212 is supplied through the commonly connected contacts 2 through 8, the wiper arm to the upper end of the coil 192. The rectified AC signal across the coil 192 causes the counter 34 to be advanced to the home position. It is pointed out that the rectified AC signal for advancing the counter 34 from engagement with contact 9 to contact 0 is supplied by the diode 213. The rectified AC power from the diode 213 is supplied also to the commonly connected contacts 1 through 8 of the counter 35, and this counter is advanced by successive incrementing operations to the home position. It is pointed out that the transfer reset operation actually takes place before an exposed cartridge is removed as indicated by the waveform 556 in curve L of FIG. 10. The transfer reset operation is repeated during a master reset as double insurance that the counters 33 through 35 are returned to the home position.

During the master reset operation the fiche counter 36 in FIG. 34 is advanced from contact 11 to the home position. This is done with rectified AC signals. More specifically, power on the AC line 141 is conveyed through the closed contacts 284 of the master reset relay K1, the line 141b, the diode 214, through the commonly connected contacts 2 through 12, and through the wiper arm to the upper end of the control winding 194. The power on the AC line 142 is conveyed through the closed contact 273 of the relay K1 and on the line 157b to the lower end of the control winding 194. Successive rectified AC signals at a 60 cycle rate are effective to increment the fiche counter 36 twice thereby moving the wiper arm from engagement with contact 11 to contact 1 which is the home position. It is pointed out that the fiche counter 36 remains idle with the wiper arm in engagement with contact 11 until the master reset operation takes place. When the master reset operation is completed, all of the counters 33 through 36 in FIG. 4 are reset to the home position.

When a new cartridge is inserted and the switch 24 in FIG. 2 is returned to the position indicated by the phantom lines, the master reset operation is terminated. At this time the switch 24 is returned to the open position in FIG. 3, and the master reset relay K1 is de-energized. The contacts 108 in FIG. 3 thereby are opened, and the contacts 116 are closed again. Power from the DC lines 102 and 104 is then supplied to the motor 114 and the primary winding 110 assuming, of course, that the on-off switch 31 remains closed. The AC signal supplied to the primary winding 110 of the transformer T1 is coupled to the secondary winding 140 thereby to provide AC and DC power to the circuits of FIGS. 4 and 5. The contact 305 in FIG. 5 are closed again, and DC power is made available for operating the relays K2 through K5. Also, the contacts 414 in FIG. 5 are opened thereby to de-energize the transfer reset relay K6. Furthermore, the contacts 273 and 284 in FIG. 4 of the master reset relay K1 are opened thereby to remove rectified AC power from the fiche counter 36, and the contacts 281 and 282 in FIG. 4 of the relay K6 and the contacts 283 in FIG. 4 of the relay K3 are opened whereby rectified AC power is terminated to the frame counter 33 and the column counters 34 and 35. The camera 8 in FIG. 1 then is ready to proceed with further recording operations which are performed by placing documents in the appropriate place on the base 10 in FIG. 1 and depressing the record button 26.

Thus a unique and novel camera is provided for optically recording information on the frames of a strip film which is thereafter converted to microfiche composed of photographic frames disposed in columns and rows. The camera is inexpensive to manufacture and maintain, and it performs automatically each of its functions in response to operation of the record switch 26 in FIG. 1. The only manual operations involved are the inserting a cartridge, returning the switch 24 in FIG. 2 to the position shown by the phantom lines after a cartridge is inserted thereby to perform a master reset, the placing documents on the base 10, and operating the record switch 26 for each document.

While the invention has been particularly shown and described with reference to preferred embodiments thereof, it will be understood by those skilled in the art that various other changes in form and details may be made therein without departing from the spirit and scope of the invention.

What is claimed is:

1. A fiche camera for exposing frames on a film strip which subsequently is converted to a matrix of photographic frames disposed in columns and rows, said camera including:
    a film transport for advancing a film strip,
    a shutter for exposing frames on a film strip,
    fiche coordinate counting means,
    a control arrangement coupled to the fiche coordinate counting means, the shutter, and the film transport, a source of electrical power connected to the control arrangement,
    said control arrangement including a master reset relay, a cycle permissive relay, a record cycle relay, a motor power relay, an index cycle relay, and a transfer reset relay, a master reset switch coupled to said master reset relay for operating the master reset relay, a record switch coupled to said record cycle relay for operating said record cycle relay, a skip switch coupled to said record cycle relay for operating said record cycle relay, a limit switch having first and second contacts, said first contact connecting said source of power to said motor power relay, and said second contact connecting said source of power to said index cycle relay, first means connecting the fiche coordinate counting means and the transfer reset relay for operating said transfer reset relay whenever the fiche coordinate counting means registers given values, second means connected to the fiche coordinate counting means and the index cycle relay for operating the index cycle relay each time the fiche coordinate counting means registers given values, and third means connected to the cycle permissive relay and the fiche coordinate counting means for permitting the operation of the cycle permissive relay whenever the fiche coordinate counting means registers a count less than a given value, and additional switch means connected to said third means, said third means and said additional switch means operating the cycle permissive relay whenever both of said third and said additional switch means are operated.

2. The apparatus of claim 1 wherein a cartridge of film is disposed in the camera, said master reset switch includes a shaft with a knob thereon, said shaft being rotatably mounted adjacent to the film cartridge, said knob being rotatable to one position which prevents removal of the cartridge and to a second position which permits its removal, said master reset switch energizing said master reset relay when the knob is rotated to the second position whereby the master reset relay is operated to reset said fiche coordinate counting means to the home position.

3. A fiche camera arrangement for recording documents on photographic frames of a film strip which thereafter is converted to an array of photographic frames on a fiche, said camera arrangement including:
    a reel for holding strip film, transport means coupled to said reel of strip film for advancing the film,
    shutter means for exposing frames of film, record means coupled to the shutter means, the record means being operated to actuate the shutter,
    fiche coordinate counting means coupled to the record means, the fiche coordinate counting means responding to the operation of the record means to register the number of the frame in a fiche column which is disposed behind the shutter, the number of the fiche column for such frame, and the number of the fiche in the reel of film for such column,
    the fiche coordinate counting means including a first counter for counting the frames in a fiche column, a second counter for counting the fiche columns, and a third counter for counting the fiches in a reel of film,
    means connecting the record means to the first counter which operates the first counter each time the record means is operated, means connecting the first counter to the second counter which operates the second counter each time there is an overflow carry condition produced by the first counter when it registers its maximum count,
    control means connecting the second counter to the third counter, said control means being operated when the second counter reaches a predetermined count thereby to operate the third counter, display means coupled to the first counter, the second counter, and the third counter which visually presents the frame number in a column registered by the first counter, the fiche column number registered by the second counter, and the fiche number in a reel of film registered by the third counter.

4. The apparatus of claim 3 wherein:

master reset means is connected to said first, second, and third counters, said master reset means including a switch which is operated to operate simultaneously each one of the first, second, and third counters to a given position.

5. The apparatus of claim 3 wherein:

the first counter is a decade counter, the second counter is a two stage counter having first and second stages, each stage having a decade counter, means connecting the decade counter of the first stage to the decade counter of the second stage for operating the decade counter of the second stage each time the decade counter of the first stage passes through its maximum count, the third counter is a counter which counts in the scale of 12, and said control means connecting the second counter to the third counters responds to a fiche column count of seventeen in the second counter and operates the third counter.

6. The apparatus of claim 5 wherein:

said first counter has a predetermined count designated the home position, said second counter has a predetermined count designated the home position, said third counter has a predetermined count designated the home position, and further means is connected to said control means and said second counter, and said further means responds to a fiche column count of 17 in said second counter and resets said second counter to the home position.

7. The apparatus of claim 6 wherein:

the first, second, and third counters employ electromechanical counters, each said electromechanical counter including a set of readout contacts, a set of control contacts, wiper arms for the readout and control contacts, a moveable display mechanism which displays the count registered by the counter, and a solenoid operated mechanism to operate the wiper arms and the display mechanism, said electromechanical counters retaining their registered count when de-energized whereby their registered count is not lost in the event power is terminated.

8. The apparatus of claim 7 wherein:

master reset means is connected to said first, second, and third counters, said master reset means including a switch means which is operated to advance simultaneously each one of the first, second, and third counters to the home position.

9. The apparatus of claim 8 wherein:

a source of half-wave rectified alternating current power is connected to the master reset means, and the half-wave rectified alternating current is supplied to the solenoid operated mechanism of each one of the first, second and third counters thereby to advance each counter simultaneously to the home position whenever said switch means is operated.

10. The apparatus of claim 9 wherein:

an end film lamp is connected to given readout contacts of said third counter whereby said end film lamp is operated whenever the wiper arm of said third counter engages said given readout contacts.

11. A fiche camera arrangement for recording documents on photographic frames of a film strip which is converted after being developed to an array of photographic frames on a fiche, said camera arrangement including:

a reel for holding strip film, transport means coupled to said reel of strip film for advancing the film, shutter means for exposing frames of film, record means coupled to the shutter means, the record means being operated to actuate the shutter, fiche coordinate counting means coupled to the record means, the fiche coordinate counting means responding to the operation of the record means to register the number of the frame in a fiche column which is disposed behind the shutter, the number of the fiche column for such frame, and the number of the fiche in the reel of film for such column, cycle permissive means, first control means coupled to the cycle permissive means and the record means, said first control means being operated by said cycle permissive means to permit operation of said record means, second control means coupled to the cycle permissive means and the record means, said second control means being operated by said record means to inhibit operation of said cycle permissive means, whenever said record means is operated, and third control means coupled to the record means and the transport means, said third control means being operated by the transport means after each frame of strip film is advanced to deactivate said record means, whereby said record means once operated cannot be operated again to actuate the shutter until the transport means advances the film strip to a new frame thereby preventing double exposures on any given frame on the film.

12. The apparatus of claim 11 further including:

display means coupled to the fiche coordinate counting means for displaying the number of the frame in a column, the number of the column in a fiche, and the number of the fiche in a reel of film.

13. The apparatus of claim 12 wherein:

the fiche coordinate counting means includes a first counter for counting the frames in a column, a second counter for counting the columns of a fiche, and a third counter for counting the fiches in a reel of film.

14. The apparatus of claim 13 further including:

master reset means connected to said first, second, and third counters, said master reset means including a switch which is manipulated to operate simultaneously each one of the first, second, and third counters to a given position.

15. The apparatus of claim 13 wherein:

the first, second, and third counters employ electromechanical counters, each said electromechanical counter including a set of readout contacts, a set of control contacts, wiper arms for the readout and control contacts, a moveable display mechanism which displays the count registered by the counter, and a solenoid operated mechanism to operate the wiper arms and the display mechanism, said electro mechanical counters retaining their registered count when de-energized whereby their registered count is not lost in the event power is terminated.

16. The apparatus of claim 15 wherein:

master reset means is connected to said first, second, and third counters, and said master reset means includes a switch means which is operated to advance simultaneously each one of the first, second, and third counters to given positions.

17. The apparatus of claim 15 wherein:

a source of half-wave rectified alternating current power is connected to the master reset means, and the half-wave rectified alternating current is supplied to the solenoid operated mechanism of each one of the first, second, and third counters thereby to advance each counter simultaneously to said given positions whenever said switch means is operated.

18. The apparatus of claim 16 wherein:

means is connected to said transport means which is manipulated to operate said transport means and thereby advance the film in the camera by one frame.

19. The apparatus of claim 15 wherein:

an end film lamp, said end film lamp being connected to selected readout contacts of said third counter whereby said end film lamp is operated whenever the wiper arm of said third counter engages said selected readout contacts.

20. The apparatus of claim 19 further including:

indexing means, said indexing means being connected between a given readout contact of said first counter and said transport means, said indexing means operating said transport means to advance the film by one frame whenever the wiper arm of said first counter engages said given readout contact.

* * * * *